(12) United States Patent
Rozan

(10) Patent No.: US 8,866,681 B2
(45) Date of Patent: Oct. 21, 2014

(54) VEHICLE MIRROR ANTENNA ASSEMBLY

(75) Inventor: Edouard Jean Louis Rozan, Mollet Del Valles (ES)

(73) Assignee: Advanced Automotive Antennas, S.L., Mollet Del Valles (ES)

(*) Notice: Subject to any disclaimer, the term of this patent is extended or adjusted under 35 U.S.C. 154(b) by 1381 days.

(21) Appl. No.: 12/599,495

(22) PCT Filed: May 9, 2008

(86) PCT No.: PCT/EP2008/055775
§ 371 (c)(1),
(2), (4) Date: Nov. 30, 2010

(87) PCT Pub. No.: WO2008/138902
PCT Pub. Date: Nov. 20, 2008

(65) Prior Publication Data
US 2011/0102278 A1 May 5, 2011

Related U.S. Application Data

(60) Provisional application No. 60/917,141, filed on May 10, 2007.

(51) Int. Cl.
*H01Q 1/32* (2006.01)
*B60R 1/12* (2006.01)
*H01Q 1/36* (2006.01)

(52) U.S. Cl.
CPC .. *B60R 1/12* (2013.01); *H01Q 1/36* (2013.01); *H01Q 1/3266* (2013.01); *B60R 2001/1261* (2013.01); *H01Q 1/32* (2013.01)
USPC .......................................... 343/713; 343/711

(58) Field of Classification Search
CPC ............................... H01Q 1/3266; H01Q 1/32
USPC ................................................. 343/713, 711
See application file for complete search history.

(56) References Cited

U.S. PATENT DOCUMENTS

| | | | | |
|---|---|---|---|---|
| 6,078,294 | A * | 6/2000 | Mitarai ......................... | 343/713 |
| 2004/0119644 | A1* | 6/2004 | Puente-Baliarda et al. .. | 343/700 MS |
| 2006/0022880 | A1* | 2/2006 | Chiang ........................ | 343/713 |
| 2009/0237313 | A1* | 9/2009 | Martinez Ortigosa ........ | 343/713 |

FOREIGN PATENT DOCUMENTS

EP 0566970 10/1993
WO WO2004/075342 9/2004

OTHER PUBLICATIONS

International Search Report dated Oct. 7, 2008, issued in International Application No. PCT/EP2008/055775.

* cited by examiner

Primary Examiner — Dameon E Levi
Assistant Examiner — Jennifer F Hu
(74) Attorney, Agent, or Firm — Knobbe Martens Olson & Bear LLP

(57) ABSTRACT

The present invention is generally related to an antenna assembly, and in particular to a rear-view mirror antenna assembly for motor vehicles. The antenna assembly comprises a mirror attached to a casing (11) defining an outer perimeter (4), the assembly further comprising an antenna element (1) having a radiating element, wherein said radiating element is housed within said mirror and said casing and it is located substantially along said outer perimeter.

22 Claims, 4 Drawing Sheets

VEHICLE MIRROR ANTENNA ASSEMBLY

RELATED APPLICATIONS

This application is a U.S. National Phase of International Application No. PCT/EP2008/055775, filed May 9, 2008, designating the U.S. and published on Nov. 20, 2008 as WO 2008/138902, which claims priority to U.S. patent application Ser. No. 60/917,141, filed May 10, 2007. The content of these applications is incorporated herein by reference in its entirety.

OBJECT OF THE INVENTION

The present invention is generally related to an antenna assembly, and in particular to a rear-view mirror antenna assembly for motor vehicles.

It is an object of the present invention to provide an antenna assembly, preferably for AM/FM reception, that can be efficiently integrated inside a vehicle mirror assembly while keeping a satisfactory antenna performance.

BACKGROUND ART

Typically, a rear-view mirror is fitted inside with a large number of plastic and metallic components, and even some electric components such as electrochrome mirror systems, glass heaters, mirror glass actuators, powerfold actuators, side marker indicators, puddle lights, blinker lights, wireharnesses, circuits, etc. Consequently, and due to the fact that AM/FM antennas have a large wavelength, and thus the antennas are large in size, the prior-art techniques for AM/FM antennas were not successful in achieving an AM/FM antenna that could fit inside the rear-view mirror of a vehicle while keeping a good performance of the antenna in terms of bandwidth, gain and efficiency.

SUMMARY OF THE INVENTION

The vehicle mirror antenna assembly according to the invention, comprises a mirror and a casing attached to each other. An antenna structure comprising a radiating element is housed within said mirror assembly, and it is located substantially along the outer perimeter of the mirror, thus the shape of the location of the radiating element is similar to the shape of at least part of the periphery of the mirror glass.

The radiating element is an elongated arm which has at least a part taking the form of a fractal design, said arm being made of or limited by a conductor, superconductor or semiconductor material.

The shape of the radiating element is obtained by the scaled repetition of a generating motive in a known manner, and at least two scale levels of said generating motif are used to shape the radiating element.

Preferably, the shape of the radiating element has a box-counting dimension larger than 1. The box-counting dimension is a know technique used in this technical field to characterise convoluted curves, and it is described for example in the PCT application WO04/075342. Therefore, in the present invention the box-counting dimension of a curve is calculated according to the method explained in said PCT application.

Due to the fractal design of the radiating element, the antenna structure forms a small antenna with a broadband behaviour, a multiband behaviour or a combination of both effects. Preferably, the radiating element of the antenna structure is adapted for receiving AM/FM signals.

In the present invention, it has been found that a flexible radiating element can be advantageously placed perpendicularly or almost perpendicularly to the mirror glass of the rear-view mirror assembly, surrounding all the inner mechanical and electric components of the rear-view mirror system. According to the present invention, the shape and spatial arrangement of the antenna structure inside the rear-view mirror, makes the antenna behaviour to perform better in terms of bandwidth, gain and efficiency. The signal radiation and reception is optimized due to the particular arrangement of the antenna inside the rear-view mirror.

The radiating element is a planar and flexible strip and it is fixed to a face of a flexible laminar substrate. As it can be observed in the attached figures, the laminar substrate is an elongated body, generally rectangular, which has a longitudinal axis. When the laminar substrate is attached to the mirror, it defines a curved or ring-shaped plane perpendicular to the plane defined by the mirror surface. This means that any transversal line to said longitudinal axis of the substrate, is orthogonal to the mirror surface.

Therefore, even though the prior-art shows different antenna configurations inside rear-view mirrors, this invention is the first one that allows:

- AM/FM antennas to be efficiently integrated inside the rear-view mirror. Due to the size of prior-art AM/FM antennas, it was not possible to integrate AM/FM antennas inside rear-view mirrors. Fractal technology and the particular arrangement of the antenna, allows miniaturization and therefore integration inside the rear-view mirrors while keeping the antenna performance.
- Shape of the antenna (PCB flexible) follows the outer shape of the rear-view mirror, being able to have the same antenna design in different mirrors with different mechanical characteristics. This is of special interest for operation costs, as the antenna could be standard for a specific frequency band operation, but interchangeable with other rear-view mirrors from other vehicles with only adapting the fixing method.
- By placing the antenna with this configuration, avoids getting interferences from other electronic devices placed inside the mirror, such as electrochrome mirrors, glass heaters, mirror glass actuators, powerfold actuators, side marker indicators, puddle lights, blinker lights, wireharnesses, circuits, etc.
- Also, this antenna configuration avoids drastic changes inside already-designed rear-view mirrors nowadays, therefore, minimizing the leadtime to the market of delivering the mirror with an antenna integrated. This results in better manufacturing line mounting, and better logistics.

DESCRIPTION OF THE DRAWINGS

To complement the description being made and with the object of aiding towards a better understanding of the characteristics of the invention, in accordance with a preferred example of embodiment thereof, a set of drawings is attached as an integral part of said description, wherein the following has been represented, with an illustrative, non-limiting character.

PREFERRED EMBODIMENT OF THE INVENTION

Figure 1:
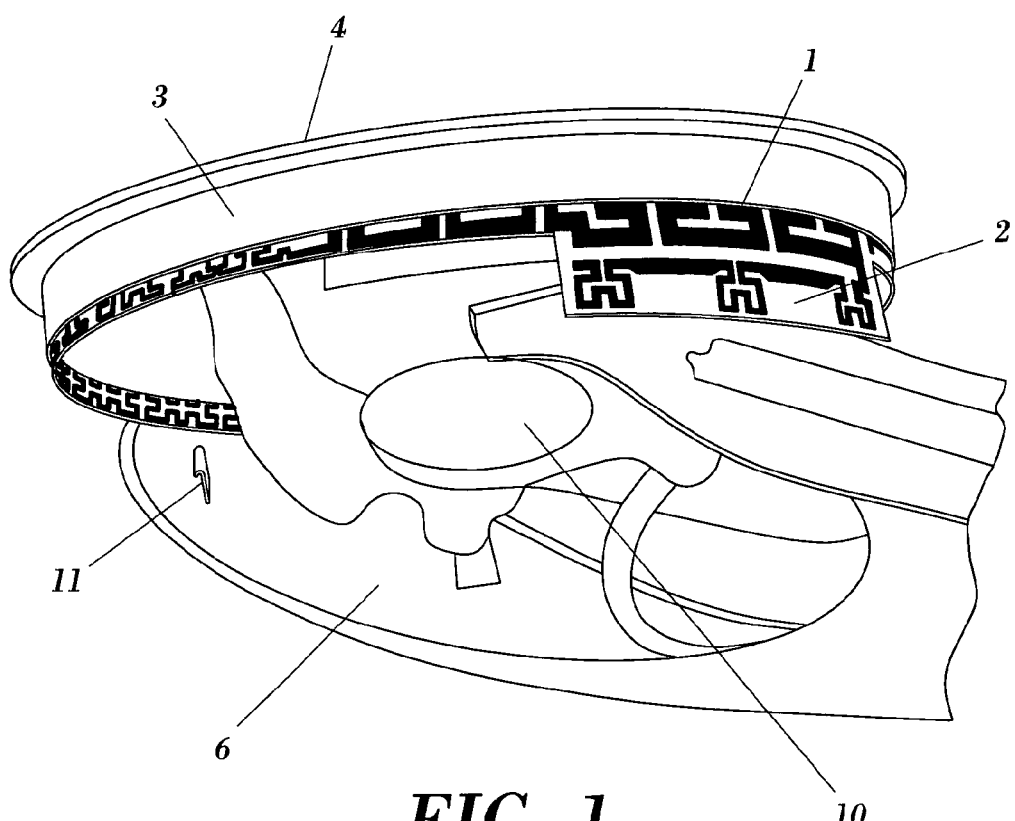
FIG. 1. shows a perspective view of a rear-view mirror assembly partially open to show the radiating element arranged inside the mirror.

In the attached figures it can be observed a rear-view mirror assembly according to the present invention, wherein the casing of the mirror has been removed for illustration purposes.

The antenna structure comprises a radiating element (1) consisting of a planar conducting strip folded according to a fractal design obtained by the scaled repetition of a generating motive (9). Several scale levels of generating motive (9) are provided to achieve a multiband/miniature behaviour of the antenna.

The radiating element (1) is joined by any know technique to a face of a flexible substrate (2), for instance the flexible substrate is a printed circuit board and the radiating element is formed on one of its faces.

Alternatively, the radiating element (1) can be fixed or printed directly on an inner surface (6) of the casing (11) of the mirror assembly. In that case, the casing of the mirror assembly acts as substrate of the radiating element. The radiating element can be printed on said inner surface of the casing by using any known manufacturing process, such as LDS (Laser Direct Structuring). This location of the radiating element maximizes the distance between the radiating element and the metallic components of the rear-view mirror, thereby minimizing interferences.

The flexible antenna element is placed inside the rear-view mirror, substantially over or close to the outer perimeter (4) of the mirror (5) itself, so that the antenna element is properly spaced out from the mechanical and electric components (10) installed inside the rear-view mirror, thus avoiding both mechanical and electrical interferences with and from those elements.

Figure 2:
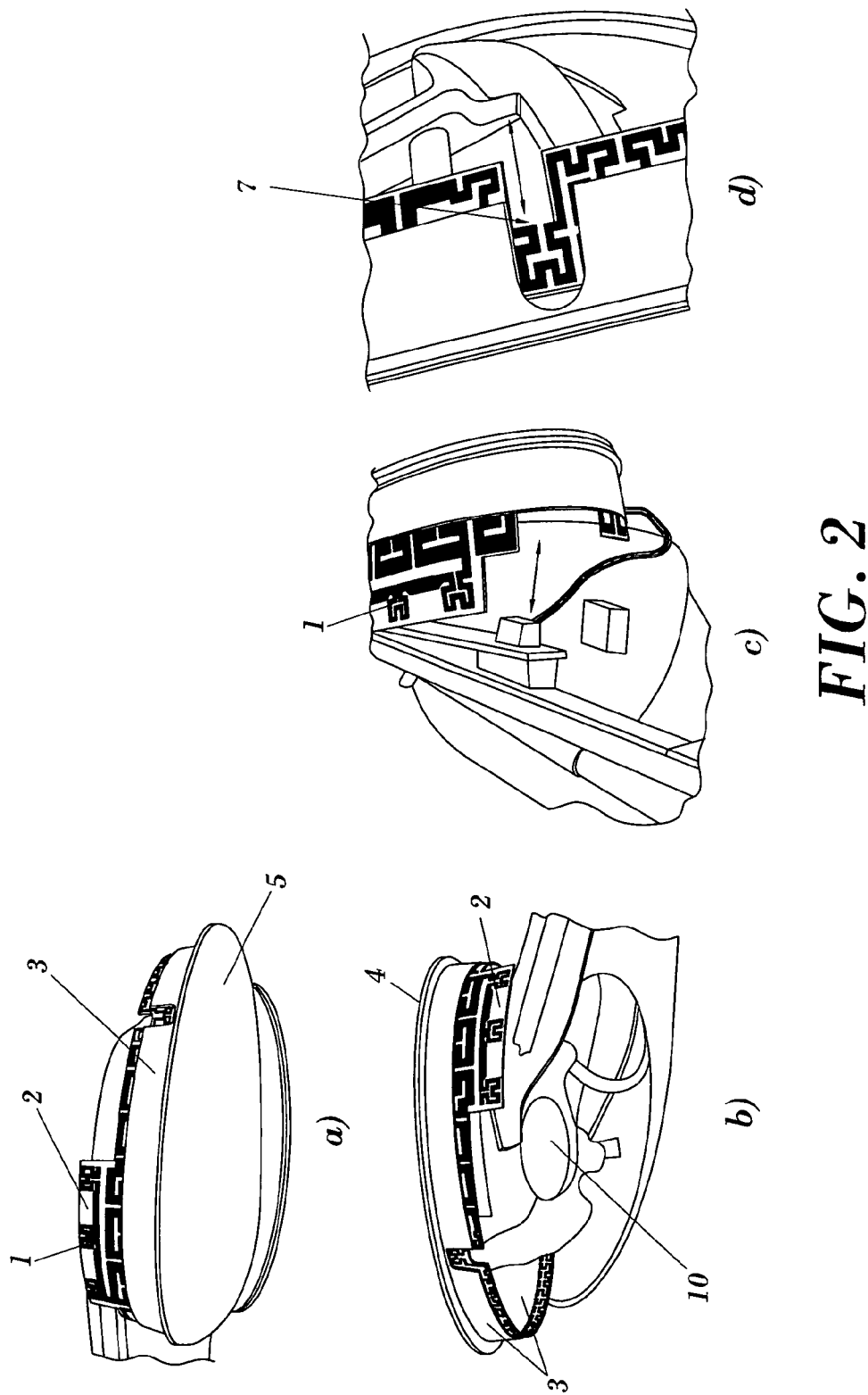
FIG. 2. shows several perspective views of the rear-view mirror of FIG. 1.

As observed for instance in FIG. 2(*a*), the mirror glass (5) defines a planar plane, and the flexible substrate (2) with the radiating element (1), is perpendicularly arranged in respect to said plane.

This particular arrangement allows the movement of the rear-view mirror in respect to the vehicle to which is fitted, without being affected by interferences in the antenna due to the metallic components inside the assembly such as the metallic bracket.

In order to install the antenna element inside the rear-view mirror assembly, the casing forms a pair of parallel walls (3) defining a narrow spacing in-between, are attached perpendicularly to a rear face of the mirror (5). The radiating element and the flexible substrate are at least partially inserted and retained within said spacing, as shown for instance in FIG. 2(*d*).

Alternatively, the antenna element can also be attached to the inner structure of the rear-view mirror by using an adhesive to a plastic wall, avoiding the need of having two parallel walls with a narrow spacing in-between. Other alternative solution is clipping the antenna element to said plastic wall.

Figure 3:
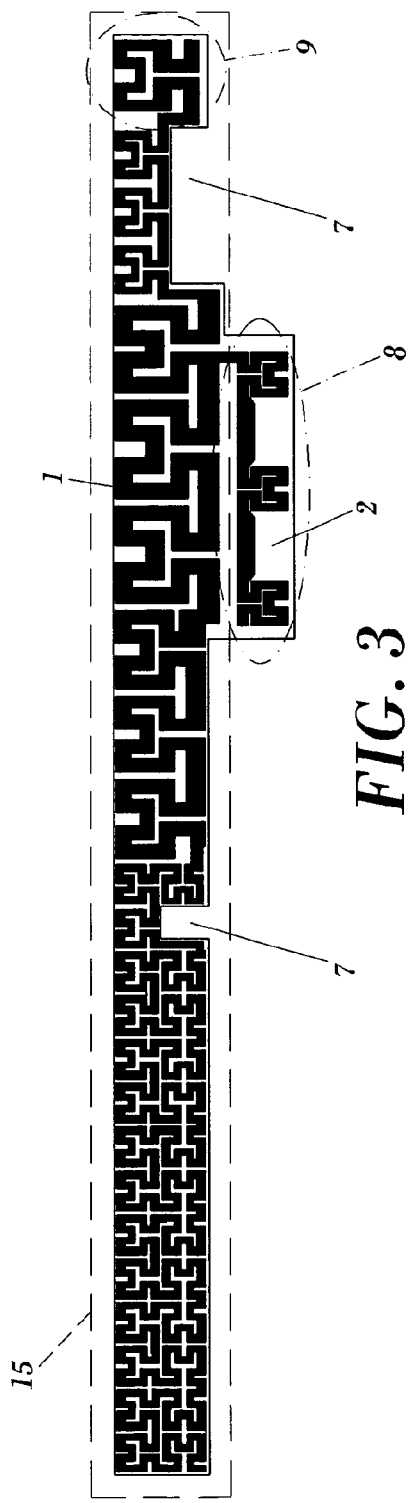
FIG. 3. shows the radiating element and the flexible substrate laying on a flat plane.

At least one branch (8) having generating motives (9) is connected to a selected point of the radiating element (1) as shown in FIG. 3.

In the embodiment of FIG. 3, the radiating element (1) defines an elongated main part (15) in the form of a straight band formed by a plurality of generating motive (9) of different scales connected in series. The structure comprises a branch (8) parallel to the radiating element (1) and connected at one point with the radiating element. The embodiment of FIG. 3 is formed by vertical and horizontal straight segments, that is any pair of two adjacent segments forms a 90° angle.

Some cut off (7) areas are provided in selected positions to avoid contact with metallic components inside the assembly.

Figure 4:
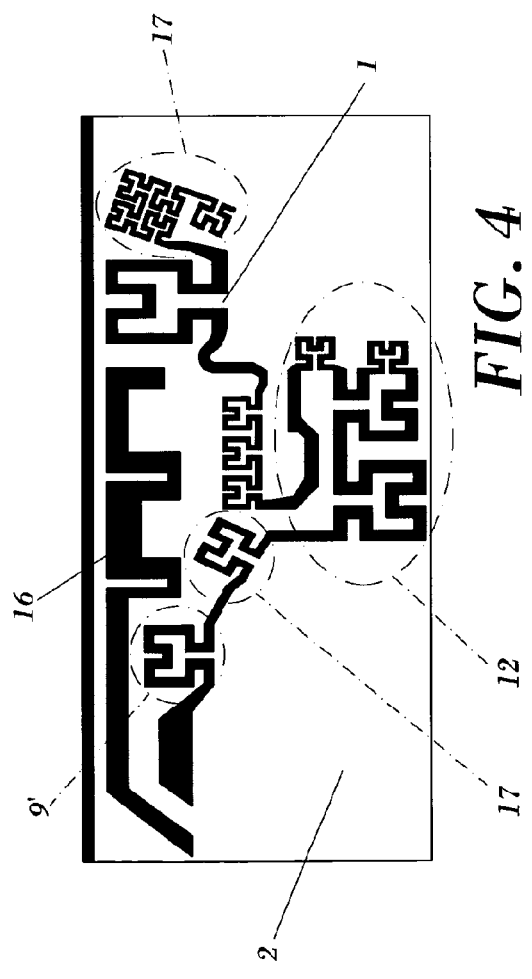
FIG. 4. shows another preferred design of the radiating element and the flexible substrate laying on plane.

In the embodiment of FIG. 4, the radiating element (1) is also formed by a scaled repetition of a generating motive (9'). In this case the radiating element (1) forms a loop (12) and includes some inclined sections (18), that is the radiating element is formed by vertical, horizontal and inclined segments, which has the advantage of improving the antenna reception of signals from different directions.

Additionally, the antenna structure has a parasitic arm (16) coupled to the radiating element (1).

Figure 5:
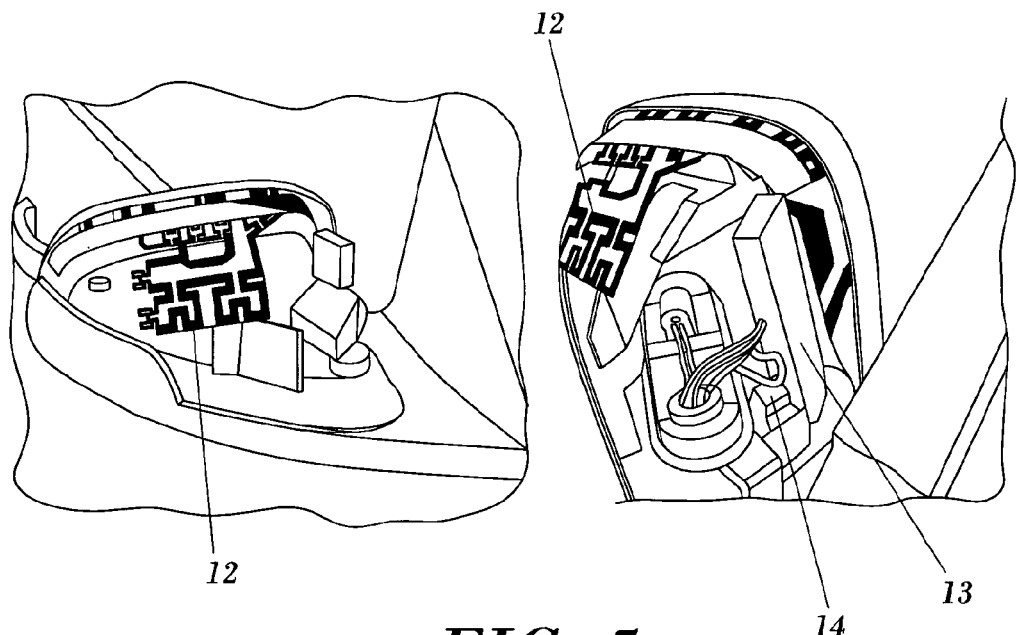
FIG. 5. shows two perspective views of the radiating element of FIG. 4 fitted to a rear-view mirror with the plastic casing removed.
Figure 6:
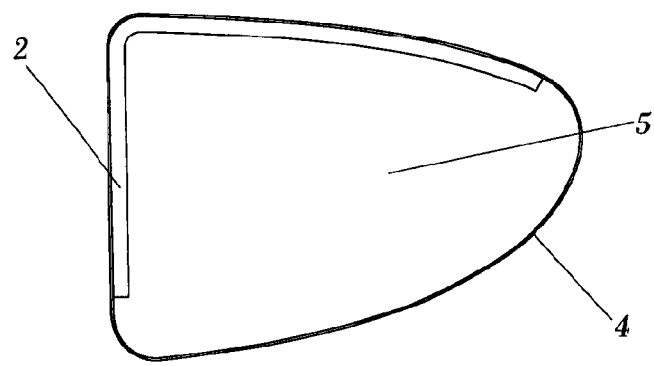
FIG. 6. is a top plan view of the mirror glass showing the arrangement of the radiating element following a part of the outer perimeter of the mirror glass.

In the embodiment of FIG. 5, a major part of the radiating element (1) follows the shape of a part of the perimeter of the mirror glass. However, the loop (12) is not perpendicular to the plane of the mirror glass. This loop (12) defines an angle with respect to the plane of the mirror glass, and it is located in close proximity to a rear part of the casing (11) as shown in FIG. 5.

The antenna structure further comprises an electronic circuit (13) such as for instance an amplifier, and some wires (14) to connect the radiating element with an electronic equipment of the vehicle.

In a preferred example, the vehicle mirror assembly comprises a liner bracket adapted for its attachment to an inner face of the casing or to a mechanical component of the mirror assembly, and wherein the radiating element and the flexible substrate are fixed to said liner bracket.

The invention claimed is:

1. A vehicle mirror antenna assembly comprising a mirror attached to a casing said casing defining an outer perimeter, the assembly further comprising an antenna structure having a radiating element, wherein said radiating element is housed within the space defined by said mirror and said casing, and wherein at least a part of the radiating element is located substantially along at least a part of said outer perimeter; wherein the radiating element is an elongated arm wherein the shape of the radiating element has a box-counting dimension larger than 1, and wherein the radiating element is configured to operate in at least two frequency bands and wherein a section of the radiating element has the form of a loop, and wherein said loop forms an angle with respect to the plane defined by the mirror glass, in such a manner that the loop is not perpendicular to the plane of the mirror glass,
wherein the radiating element includes vertical and horizontal segments which are arranged defining 90° angle between them, the radiating element further including inclined segments arranged in an inclined position in respect to said vertical and horizontal segments.

2. The vehicle mirror antenna assembly according to claim 1 wherein said loop is located in close proximity to a rear part of the casing.

3. The vehicle mirror antenna assembly according to claim 1 wherein the whole radiating element is located substantially along at least a part of the perimeter of the mirror.

4. The vehicle mirror antenna assembly according to claim 1 wherein the radiating element is printed on an inner face of the casing.

5. The vehicle mirror antenna assembly according to claim 1 wherein at least a part of the radiating element is substantially perpendicular to the mirror.

6. The vehicle mirror antenna assembly according to claim 1 wherein the mirror defines a substantially plane surface, and at least a part of the radiating element defines an angle with respect to said plane surface, said angle being within the range (−30 degrees to +30 degrees).

7. The vehicle mirror antenna assembly according to claim 1 wherein the radiating element and a substrate are arranged at least in part, along said outer perimeter of the mirror.

8. The vehicle mirror antenna assembly according to claim 1 wherein at least part of the shape of said radiating element has a fractal design.

9. The vehicle mirror antenna assembly according to claim 8 wherein the shape of the radiating element is obtained by the repetition of a generating motif, and wherein the shape of the radiating element has at least two scale levels of said generating motif.

10. The vehicle mirror antenna assembly according to claim 1 wherein the radiating element is made of or limited by a conductor, superconductor or semiconductor material.

11. The vehicle mirror antenna assembly according to claim 1 wherein the mirror assembly houses mechanical and electronic components, and the radiating element is located around said components.

12. The vehicle mirror antenna assembly according to claim 1 wherein the antenna is adapted to operate in at least in two frequency bands selected from the group comprising: AM, FM, VHF, UHF, DAB-III, DAB-L, DVB-H, DVB-T, GSM900, GSM1800, AMPS, DCS, GPS, SDARS, CDMA800, UMTS, W-CDMA, TMC (traffic message channel), RKE (remote-key entry), FBH (fuel burning heater), TPMS (tire-pressure monitoring system), Bluetooth®, Tetra, DECT, DMB, Zigbee, WLAN 802 a/b/g.

13. Vehicle incorporating at least one mirror antenna assembly according to claim 1.

14. Vehicle according to claim 13 wherein it incorporates two mirror assemblies having antenna elements adapted to operate in different frequency bands.

15. The vehicle mirror antenna assembly comprising a mirror attached to a casing said casing defining an outer perimeter, the assembly further comprising an antenna structure having a radiating element, wherein said radiating element is housed within the space defined by said mirror and said casing, and wherein at least a part of the radiating element is located substantially along at least a part of said outer perimeter; wherein the radiating element is an elongated arm wherein the shape of the radiating element has a box-counting dimension larger than 1, and wherein the radiating element is configured to operate in at least two frequency bands and wherein a section of the radiating element has the form of a loop, and wherein said loop forms an angle with respect to the plane defined by the mirror glass, in such a manner that the loop is not perpendicular to the plane of the mirror glass,
  wherein the radiating element is a planar and flexible strip, which is fixed to a face of a flexible laminar substrate.

16. The vehicle mirror antenna assembly according to claim 15 wherein said casing is provided with means for attaching said radiating element and the flexible substrate.

17. The vehicle mirror antenna assembly according to claim 16 wherein said means consist of a liner bracket adapted for its attachment to an inner face of the casing or to a mechanical component of the mirror assembly, and wherein the radiating element and the flexible substrate are fixed to said liner bracket.

18. The vehicle mirror antenna assembly according to claim 16 wherein the flexible substrate is glued to the casing.

19. The vehicle mirror antenna assembly according to claim 16 wherein the flexible substrate is fixed to the casing by clipping means.

20. The vehicle mirror antenna assembly according to claim 16 wherein said means comprises two parallel walls defining a narrow spacing in-between, wherein said walls outer perimeter and the radiating element and flexible substrate are at least partially inserted in said spacing.

21. The vehicle mirror antenna assembly comprising a mirror attached to a casing said casing defining an outer perimeter, the assembly further comprising an antenna structure having a radiating element, wherein said radiating element is housed within the space defined by said mirror and said casing, and wherein at least a part of the radiating element is located substantially along at least a part of said outer perimeter; wherein the radiating element is an elongated arm wherein the shape of the radiating element has a box-counting dimension lamer than 1, and wherein the radiating element is configured to operate in at least two frequency bands and wherein a section of the radiating element has the form of a loop, and wherein said loop forms an angle with respect to the plane defined by the mirror glass, in such a manner that the loop is not perpendicular to the plane of the mirror glass,
  wherein the radiating element includes at least one branch having a first end connected to a point of the radiating element and a second end open, and wherein the shape of said branch includes at least one generating motif shape.

22. The vehicle mirror antenna assembly according to claim 21 wherein said branch is parallel to the radiating element.

\* \* \* \* \*